(12) United States Patent
Josten

(10) Patent No.: US 11,506,240 B2
(45) Date of Patent: Nov. 22, 2022

(54) MODULAR LINKING SYSTEM, WHEELCHAIR KIT AND WHEELCHAIR

(71) Applicant: Sunrise Medical GmbH, Malsch/Heidelberg (DE)

(72) Inventor: Johannes Engelmundus Leonardus Mathias Josten, Helmond (NL)

(73) Assignee: Sunrise Medical (US) LLC, Fresno, CA (US)

( * ) Notice: Subject to any disclaimer, the term of this patent is extended or adjusted under 35 U.S.C. 154(b) by 1001 days.

(21) Appl. No.: 16/209,060

(22) Filed: Dec. 4, 2018

(65) Prior Publication Data

US 2019/0170185 A1 Jun. 6, 2019

(30) Foreign Application Priority Data

Dec. 4, 2017 (EP) ..................... 17205225

(51) Int. Cl.
| | | |
|---|---|---|
| *F16C 11/10* | (2006.01) | |
| *F16M 11/14* | (2006.01) | |
| *F16M 13/02* | (2006.01) | |
| *A61G 5/10* | (2006.01) | |
| *F16M 11/08* | (2006.01) | |
| *F16M 11/20* | (2006.01) | |
| *A61G 5/08* | (2006.01) | |

(52) U.S. Cl.
CPC .............. *F16C 11/106* (2013.01); *A61G 5/10* (2013.01); *F16M 11/08* (2013.01); *F16M 11/14* (2013.01); *F16M 11/2014* (2013.01); *F16M 11/2078* (2013.01); *F16M 13/022* (2013.01); *A61G 5/0875* (2016.11); *A61G 5/0883* (2016.11); *A61G 5/0891* (2016.11); *A61G 5/1094* (2016.11); *A61G 2203/20* (2013.01); *F16M 2200/022* (2013.01)

(58) Field of Classification Search
USPC ........................................................ 403/90
See application file for complete search history.

(56) References Cited

U.S. PATENT DOCUMENTS 3,059,948 A * 10/1962 Thompson ............ F16C 11/106
84/421
9,575,503 B2 2/2017 Josten et al.
(Continued)

FOREIGN PATENT DOCUMENTS

DE 0417566 A1 * 3/1991
DE 202009014886 U1 5/2010
(Continued)

OTHER PUBLICATIONS

Appl. No. 17205225.3, Extended European Search Report dated May 14, 2018.
(Continued)

*Primary Examiner* — Clayton E. La Balle
*Assistant Examiner* — Warren K Fenwick
(74) *Attorney, Agent, or Firm* — MacMillan, Sobanski & Todd, LLC

(57) ABSTRACT

A modular linking system provides a positioning and supporting structure for mounting various components, particularly on a wheelchair structure. A wheelchair kit includes such a modular linking system and further wheelchair includes at least one modular linking system or at least one wheelchair kit.

21 Claims, 8 Drawing Sheets

(56) References Cited

U.S. PATENT DOCUMENTS

| | | | | |
|---|---|---|---|---|
| 2004/0084230 A1* | 5/2004 | Grymko | ............... | B60K 1/04 |
| | | | | 180/65.1 |
| 2011/0150562 A1 | 6/2011 | Lutz et al. | | |
| 2015/0337890 A1* | 11/2015 | Faccioli | ............... | F16C 11/06 |
| | | | | 403/122 |
| 2019/0365584 A1* | 12/2019 | Knopf | ............... | A61G 5/1067 |

FOREIGN PATENT DOCUMENTS

| | | | |
|---|---|---|---|
| DE | 102017125048 A1 * | 2/2019 | |
| GB | 688685 A * | 3/1953 | |
| GB | S88685 | 3/1953 | |
| GB | 2213369 A | 8/1989 | |
| WO | 2014205457 A2 | 12/2014 | |

OTHER PUBLICATIONS

Permobil Permofix product literature, publication date unknown, referenced as Fig. 1 in pending U.S. Appl. No. 16/209,060.

* cited by examiner

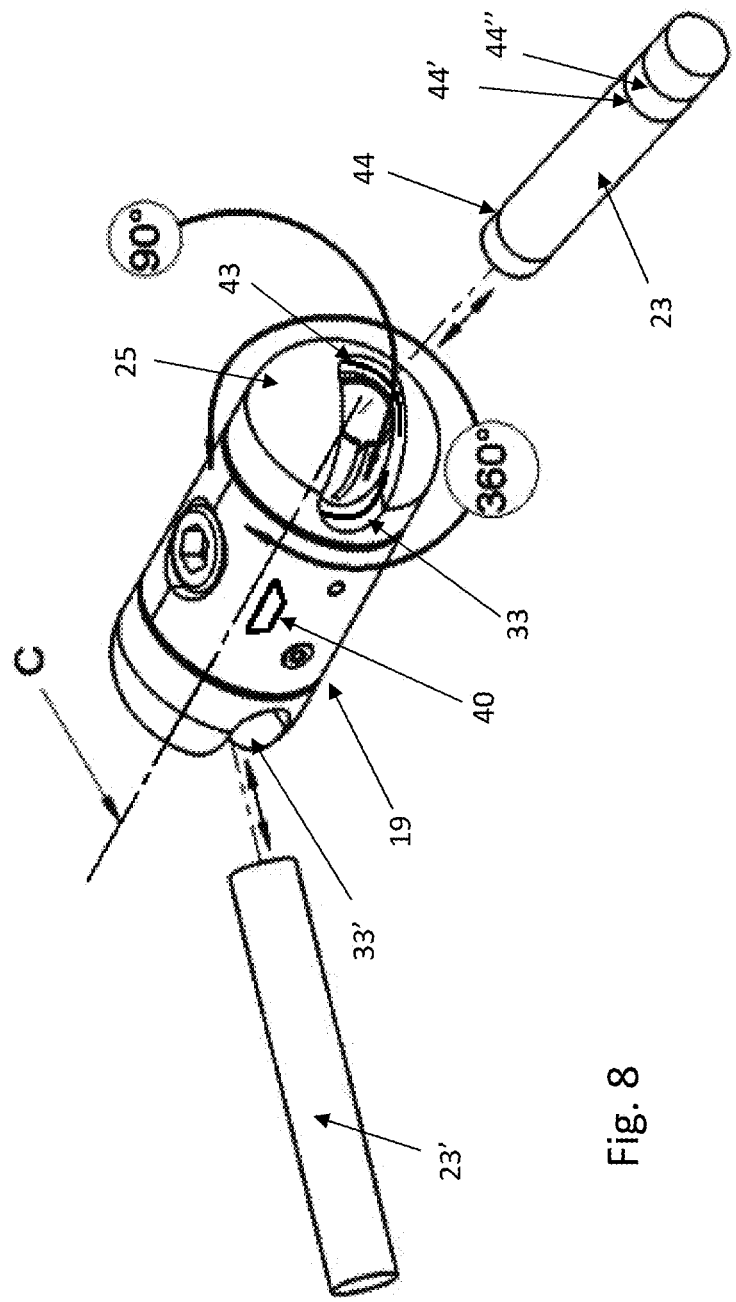

MODULAR LINKING SYSTEM, WHEELCHAIR KIT AND WHEELCHAIR

CROSS-REFERENCE TO RELATED APPLICATIONS

This application claims priority from European Patent Application No. 17 205 225.0 filed Dec. 4, 2017. The disclosure of this application is incorporated herein by reference in its entirety.

BACKGROUND OF THE INVENTION

The invention relates to a modular linking system for building up a structure to position and support various component, wheelchair kit comprising such a modular linking system and wheelchair with such a modular linking system. It refers in particular to a modular linking system with at least one linking module and at least one link to be connected therewith, wherein the linking module comprises a module body, a locking means, and at least one ball joint with a ball, wherein the ball has a slit and a central opening in form of a through hole along a center line, wherein the at least one link can be at least partly inserted into the central opening, and the locking means is adapted to releasably lock the orientation and position of each link inserted into the central opening defining a locking state and at least one release state.

Modular linking systems in general allow a flexible and easy positioning of components in three dimensional space. Especially on wheelchairs the adaption of the positions of supporting structures and various other components is important to customize them to the individual needs of the user. Such components can be for example control units, plates and holders, but also indicators, viewing devices and electrical devices such as smartphones, computers and the like. Further general framework structures for supporting and positioning objects are well known in the prior art, for example scaffolding, space frames, display stands and the like.

WO 2004/205457 A2 discloses for example a display framework connection system comprising a plurality of frame members, preferably tubular, a plurality of end flanges, and a hub system. The hub system can comprise a hub plate assembly and/or a hub casting assembly. In addition, at least one clamp assembly, preferably cylindrical, can be included for circumferential attachment to the outer surface of the frame members to provide for selective removable fastening of various attachments and accessories at positions along the length of the frame members. The hub plate assembly and the hub casting assembly can be connected individually to the frame members, or in combination, to enable selective angular configuration of the frame members to construct a frame construction, such as those commonly utilized in display frame systems. However, the connection between the frame members is more complex and lacks positioning and modification flexibility.

Ball joints allow a wide range of angular motion and are especially suited for the adjustment of the position and orientation of framework elements. DE 20 2009 014 886 U1 discloses a ball pivot, having a fastening groove arranged in axial direction between a thread section and a conical section of a pin tub. The groove is limited by a bulge at an axial end that is turned towards the conical section, where the pivot is designed as a hollow ball. However, the framework elements are either screwed into the balls of the ball joints or are integrally formed with the balls, reducing the flexible and easy adjustment and replacement of the framework elements for changing the framework design.

U.S. Pat. No. 9,575,503 B2 describes an adjustable and reconfigurable head array system for a power wheelchair, including a head array body and one or more lateral arms. The head array body includes shafts. Each of the shafts includes lateral arm receiving sections. The one or more lateral arms are detachably coupled to one of the lateral arm receiving sections of one of the shafts. However, the head array system is not flexible enough to realize arbitrary designs and cannot be easily reconfigured.

A genetic modular linking system providing a rigid fixation of wheelchair parts in all direction is offered under the trade name Permofix® and will be described in further detail with reference to FIG. 1 following.

FIG. 1 shows the basic parts of the known modular linking system in form of a linking module 1 with a module body 2, links in form of rods 3, 3', a screw 4, end cap 5 and balls 6, 6'. The module body 2 comprises wedges 9, 9' and discs 10, 10'. Ball joints are formed by the end cap 5 and end 5' when arranging the balls 6 therein and closing the opposite sides with the respective disc 10, 10'. Each ball 6, 6' has a slit 7,7' as well as a central opening 8, 8', into which one of the links 3, 3' can be inserted for positioning and fixing. One end 5' of the module body has an elongated opening 12', allowing the insertion and the limited rotation of link 3' within the ball 6'. The second end is formed by an end cap 5 with opening 12 which is screwed onto the module body 2 via the cooperation of threads 11, 11'. End cap 5 is therefore rotatable by 360° around the central axis C, however, the distance to the module body is changed during rotation. The balls 6, 6' are in principle freely rotatable in all directions, but when limited by the inserted links 3, 3' can move along the openings 12, 12' of the end cap 5 and end 5', rotating up to an angle of approximately 90° with respect to the central axis C at end 5' and about 30° around the central axis at end cap 5.

By rotating the screw 4, wedges 9, 9' are either pushed away from the center of the module body 20 or pulled closer together. When pulled closer together, the wedges 9, 9' push discs 10, 10' out into the direction of the balls 6, 6', which in turn press the balls 6, 6' against the end cap 5 and end 5', respectively. The balls 6, 6' are split, having slits 7, 7', so they close in when getting compressed, reducing the size of the center holes 8, 8'. In this way a link 3, 3' inserted into a center hole 8, 8' gets clamped.

By rotating the end cap 5 the clamping forces are released and, especially when the end cap 5 is rotated too much, the assembly falls apart. Additionally, once the modular linking system is clamped, also the position and orientation of the screw 4 in space is fixed.

Therefore, the known modular linking systems have several disadvantages:

First, many modular linking systems cannot be mounted, dismounted or repositioned easily and quickly due to the sophisticated technical fastening means, requiring several steps and different tools to fulfill the task.

Second, when unlocking the linking modules in order to be able to position or orientate the links, there can be the risk that parts of the linking module or the linking module itself fall apart, getting lost, damaged, soiled and the like. Keeping several parts together also increases the efforts of reconfiguration.

Third, prior art modular linking systems have a limited positioning capability.

Fourth, the (un-)locking mechanism of prior art linking modules can become inaccessible or hardly accessible due to the fixed position or limited accession orientation capability of this mechanisms. This in turn increases the efforts of (un-)locking and hinders the quick and easy reconfiguration.

Fifth, realizing different forms or types of connections is not straightforward and routinely requires additional parts or completely different linking module designs. This increases the costs of such modular linking systems for the producer due to the need to produce more parts and different designs. It also increases the costs of the user because he needs to buy more parts and different designs to realize different forms and shapes. Additionally it also increases the burden of reconfiguration because all the different parts and design have to be not only in stock, but also on hand at the specific situation when wanting to reconfigure the form of the modular linking system. At last, changing parts and designs often require additional steps and different tools, making the reconfiguration harder and slower.

Sixth, the locking forces of existing systems are of limited strengths.

Seventh, when wanting to distribute power or data to or between different parts of the modular linking system or to or between different components attached to it, systems of wires externally attached to the modular linking system are used. This in turn increases the efforts of reconfiguration by having first to loosen the wires from the modular linking system and then having to reapply them after reconfiguration. But the fastening means for the wires are often of a one-time use type, such that additional parts are needed. Even more severe is the case when after reconfiguration, the length of the wires do not match with the new form of the modular linking system, making it inoperable or requiring again additional parts on hand. External wires which are only loosely attached to the modular linking module, for example to allow a movement function, are also a source of tripping or getting caught or stuck. This can lead to injuries or damages of the wires, up to making the equipment inoperable.

Therefore it would be desirable to further develop the known modular linking system to overcome the drawbacks of the prior art.

SUMMARY OF THE INVENTION

This invention relates to modular linking systems for building up a structure to position and support various component, wheelchair kit comprising such a modular linking system and wheelchair with such a modular linking system.

The invention provides a modular linking system having at least two shells, which are adapted to be attached to the module body, and the at least one ball joint comprises an end cap, which has a first elongated opening and is rotatably held between the module body and shells, with the ball being rotatably arranged between the module body and the end cap and the ball at least partly being housed within the end cap.

Further preferred embodiments are described in the examples below. In one embodiment the end cap has a bulbous shape, and/or the end cap is adapted to be arranged at least next to the module body, and/or the end cap is adapted to encompass at least part of the module body.

In a further embodiment the first elongated opening of the end cap is adapted to allow a rotation of the link locked within the ball in a range from 0° to at least at least 90°, preferably 120°, most preferably 150°, relative to the central axis of the, in particular substantially rotational symmetrical, linking module, and/or the end cap comprises a second opening aligned to the first elongated opening to allow the link to pass both openings in order to provide a T-connection.

In a further embodiment the at least one end cap is provided with at least one first connection portion and the shells are provided with at least one second or third connecting portion suited to engage the at least one first connection portion to form an, in particular hook-type, connection, with preferably said connection being adapted to rotatably hold the at least one end cap between the module body and shells and/or extending substantially around the complete circumference of the at least one end cap and the shells. It is preferred that the at least one first connection portion of the at least one end cap and the at least one second or third connecting portion of the shells have an inclination angle ($\alpha$) with respect to an axis perpendicular to the central axis (C, C'), with $0° < \alpha \leq 45°$, preferably $\alpha = 5°$.

In a further embodiment the module body comprises at least one wedge and/or at least one disc cooperating with the locking means for locking the link within the central opening by at least partly closing the slit.

In a further embodiment the at least one wedge has a rotationally symmetric shape substantially in form of a cone, and/or the at least one wedge is provided with an threaded opening, and/or the at least one wedge is moved in a first direction, preferably substantially perpendicular to the central axis of the linking module and/or towards the central axis, in the locking state, and is moved in a second direction, preferably opposite of the first direction, in the at least one release state.

In a further embodiment the at least one disc has a rotationally symmetric shape, and/or the at least one disc is provided with a depression complementary to the shape of the ball to engage the same, and/or the at least one disc is moved in a third direction, preferably substantially parallel to the central axis of the linking module in the locking state, and is moved in a fourth direction, preferably opposite of the third direction, in the at least one release state.

In a further embodiment the shells house at least part of the module body, preferably the complete module body, and/or the shells are secured to the module body, preferably via at least one bolt, and/or the shells are connected with each other via a bayonet connection.

In a further embodiment the locking means comprises a screw, and/or the locking means comprises a nut disposed around the circumference of the module body, and/or the locking means comprises a ratchet mechanism.

In a further embodiment the modular linking system comprises at least two ball joints, with preferably in case of two ball joints they are arranged at opposite sides of the module body, or in case of three ball joints each one is arranged at an end of a T form.

In a further embodiment two wedges cooperate with two discs in one linking module.

In a further embodiment the modular linking system comprises at least two linking modules being adapted to be connected to each other, with preferably two connected linking modules carrying three ball joints, and/or two connected linking modules having different structures, and/or a first linking module having a substantially cylindrical form with two ends, and/or at least one second linking module being attachable to one of the two ends of a first linking module.

In a further embodiment at least one of the shells of a second linking module comprises a third connection portion adapted to engage the second portion of at least one other shell of a first linking module, with preferably the connection between the shells being of a hook-type or bayonet-type, and/or the second linking module being held between the module body and shells of the first linking module, and/or at least part of the first linking module being adapted to be rotated around its central axis and at least part of the second linking module being adapted to be rotated around its central axis.

In a further embodiment the connection portion of the at least one end cap and/or the corresponding receiving portion of the shells extend around the substantially complete circumference of the at least one end cap and the shells, respectively.

In a further embodiment one of the shells of the second linking module comprises at least two corresponding third connection portion adapted to form a connection with the second connection portions of the shells of the second linking module, and/or at least two of the shells of the second linking module comprise each at least one third connection portion adapted to form a connection with second connection portions of shells of at least two first modules.

In a further embodiment the modular linking system comprises an adapter element adapted to connect at least two linking modules, in particular to connect at least one first linking module with at least one second linking module.

In a further embodiment the at least one corresponding connection portion of the shells of the first linking module extends substantially around the circumference of the shells, and the modular linking system comprises an adapter element adapted to connect on a first side to the at least one corresponding connection portion of the shells of the first linking module and on another side, preferably opposite the first side, to respective receiving portions of shells of a second linking module, such that at least part of the first linking module is rotatably connected to the adapter element and rotatable around a first axis, and/or at least part of the second linking module is rotatably connected to the adapter element and rotatable around a second axis, preferably without changing the orientation of the first or second linking module, respectively.

In a further embodiment the locking means is adapted to individually lock the orientation and position of each inserted link, defining an individual locking state and at least one individual release state per link, and/or each end cap comprises an additional locking means for locking the orientation thereof relative to the shell and/or the module body, preferably the additional locking means is also adapted to at least partly close the slit of the ball arranged therein. and/or to engage the link.

In a further embodiment modular linking system, in particular each linking module together with at least one link connected thereto, is adapted to provide an integrated power and/or data distribution network, with preferably the linking module comprises an inlet/outlet for connecting external devices to the integrated power and/or data distribution network.

In a further embodiment each ball joint has its own locking means being used for individually locking and releasing the respective link within the central opening by at least partly closing and opening the slit of the respective ball.

In a further embodiment the integrated power and/or data distribution network comprises a Firewire system, a PowerLan system, a HomePlug system, a LAN system, a power system and/or any combinations thereof. Furthermore, a wheelchair kit comprising a modular linking system according to any of the preceding embodiments. Even further, a wheelchair kit having at least one first linking module body, at least one second linking module and at least three, preferably rod shaped, links. In addition a wheelchair comprising at least one of the embodiments of a modular linking system according to the embodiments described above or at least one wheelchair kit according to the embodiment described above.

In particular the modular linking system of the invention has the following advantages:

The modular linking system can be quickly and easily reconfigured, requiring a minimal number of steps and tools to complete this task.

An integrated linking module is provided such that no loose parts can separate from the linking module and the modular linking system can easily be reconfigured.

An increased positioning capability is provided.

An (un-)locking mechanism with a large accession capability or suited to be re-positioned and re-orientated is provided.

The number of parts and designs is reduced by integrating more functions and functionalities into fewer parts and designs.

The modular linking system provides stronger locking forces for locking the modular linking system.

The modular linking system is provided with integrated power and/or data distribution capability, reducing the number or the length of external wires or making the usage of external wires obsolete.

Thus, a modular linking system, which is based on connecting multiple linking modules via links is provided. By varying the orientation, length and shape of the links, different three dimensional forms and shapes can be realized. In particular complete frameworks can be built up.

Various aspects of this invention will become apparent to those skilled in the art from the following detailed description of the preferred embodiment, when read in light of the accompanying drawings.

BRIEF DESCRIPTION OF THE DRAWINGS

FIG. 8 is an exploded view of the modular linking system of FIG. 7

DETAILED DESCRIPTION OF THE PREFERRED EMBODIMENT

Figure 1:
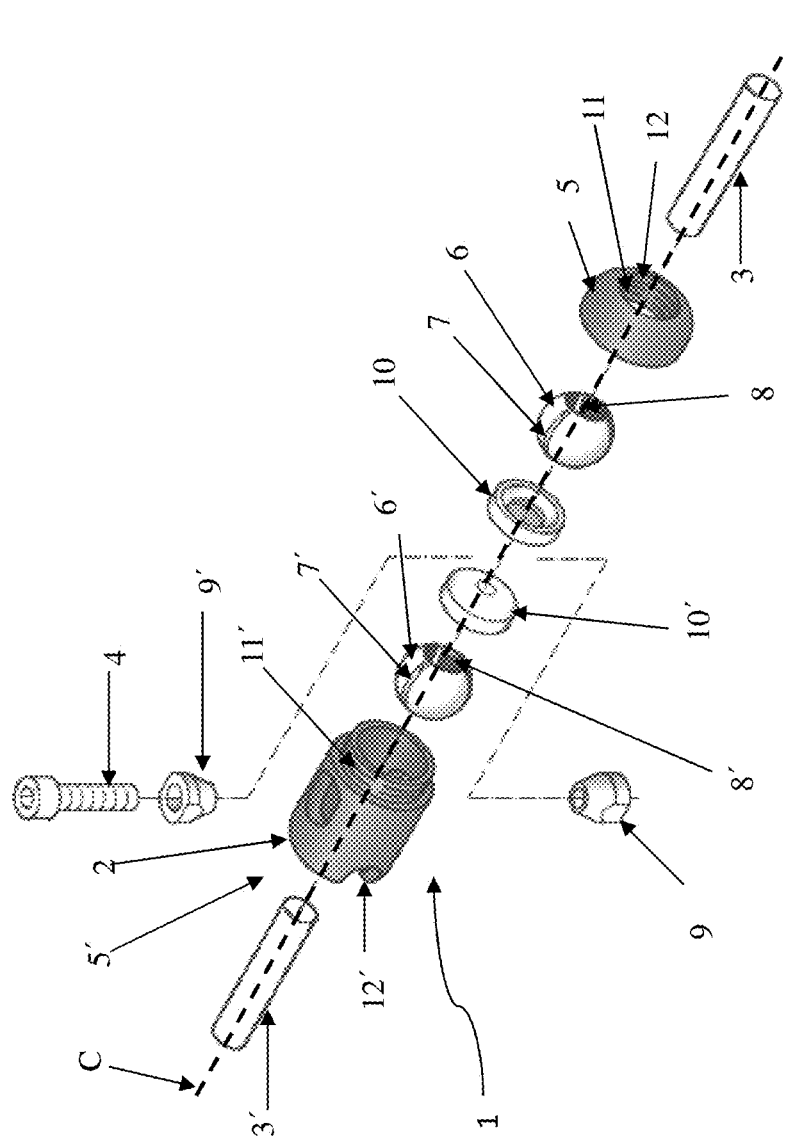
FIG. 1 is a perspective view of a prior art modular linking system.
Figure 2:
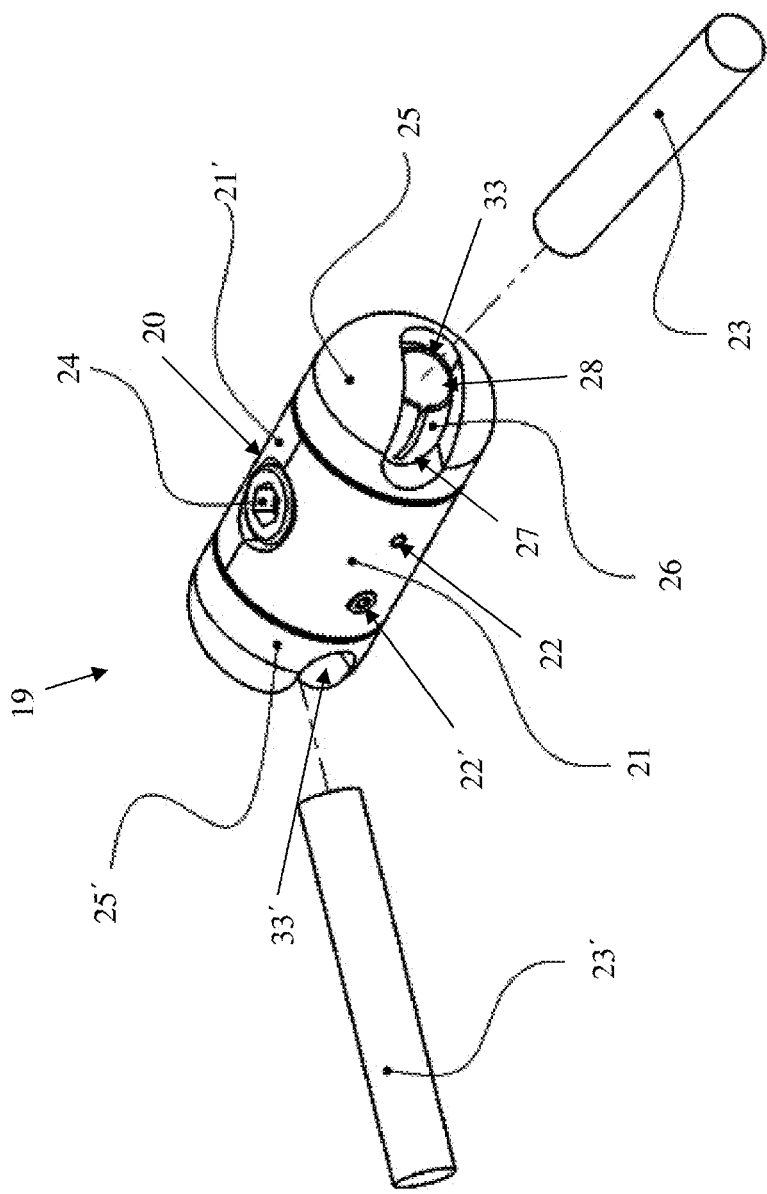
FIG. 2 is an exploded view of modular linking system according to a first embodiment of the invention.
Figure 3:
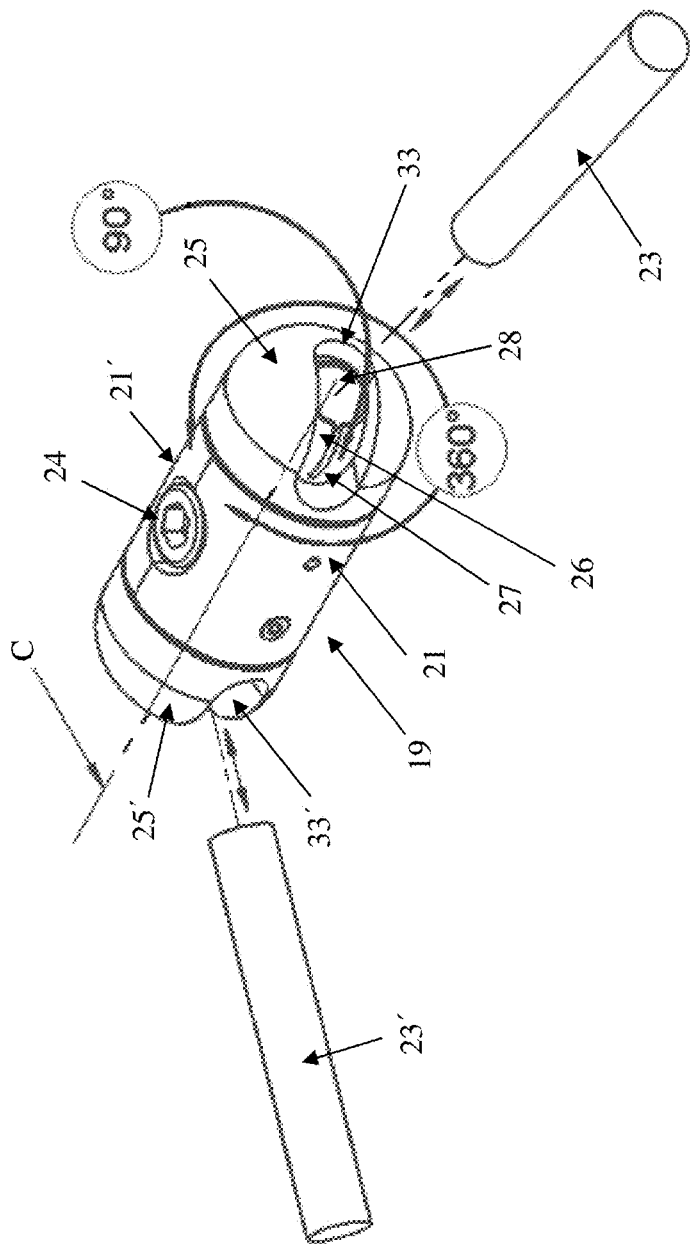
FIG. 3 is the view of FIG. 2 with arrows indicating the various degrees of freedom of the modular linking system.
Figure 4:
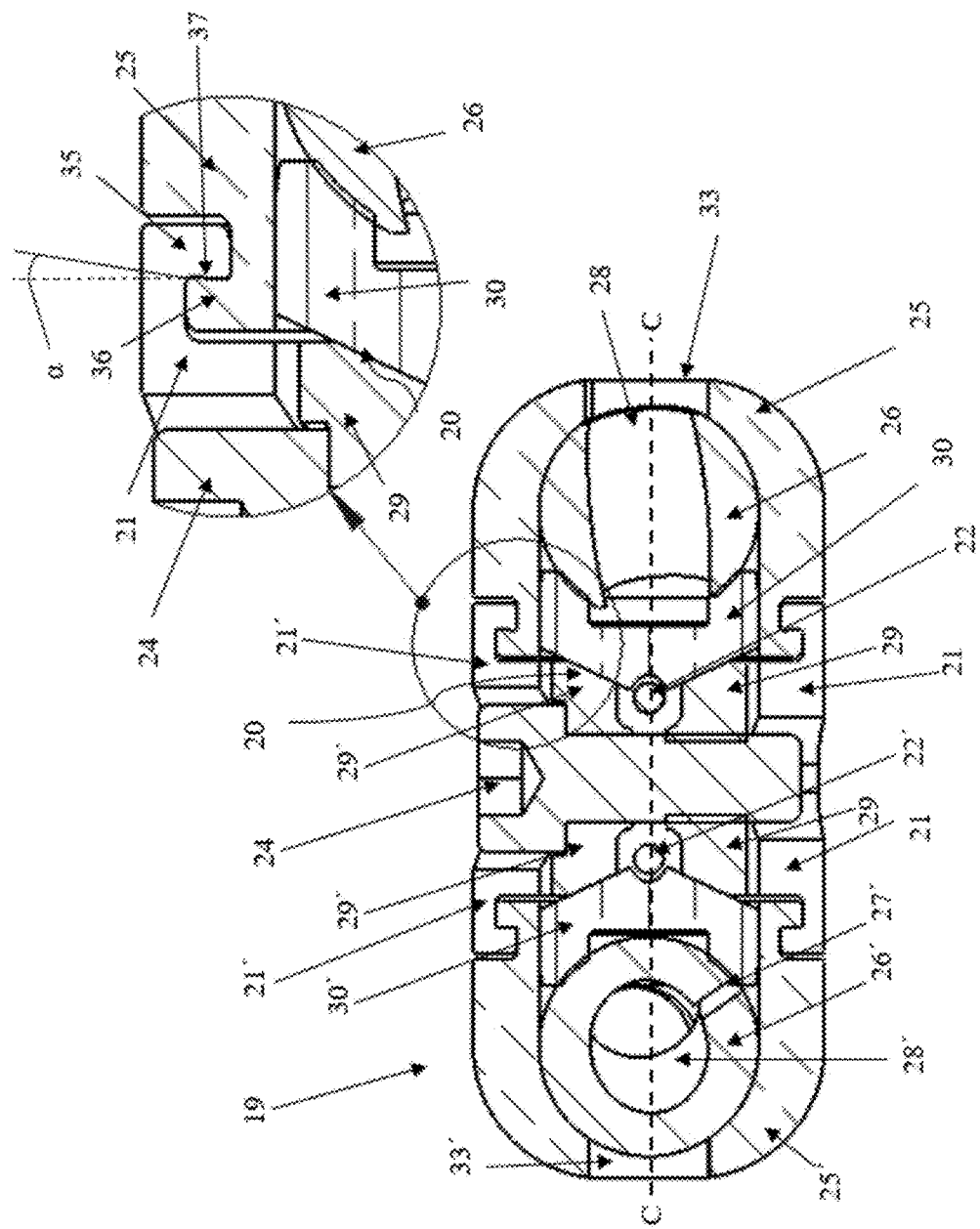
FIG. 4 is a sectional view of the linking module according of FIGS. 2 and 3, together with an enlarged view of a part thereof.

Referring now to the drawings, a first modular linking system of the invention is shown in FIGS. 2 to 4. The modular linking system comprises a linking module 19 and links, in particular in form of rods 23, 23'. Each linking module 19 comprises a module body 20, two ball joints, each of which is formed by an end cap 25, 25' and a ball 26, 26', shells 21, 21' and a locking means 24, 24' for (un-) locking the connection between the linking module 19 and the rods 23, 23'. Basically the linking module does not need to comprise two ball joints, therefore depending on the desired applications, the use of one ball joint is sufficient. When no rotational or angular degree of freedom is desired, even no ball joint could be comprised.

The balls 26, 26' each have a slit 27, 27' and a central opening 28, 28', in which a rod 23, 23' can be inserted in order to position and fix the rod 23, 23'. The end caps 25, 25' each have one first opening 33, 33', which is preferably elongated. The first opening 33,33' allows the insertion of the rods 23, 23' into one central opening 28, 28' of the balls 26, 26' and an orientation of the rods 23, 23' together with the balls 26, 26'. The two shells 21, 21' are here connected via two bolts 22, 22' and, once tightened, by the central locking means 24, 24' push together via a conical shaped bayonet connection.

FIG. 3 shows the positioning capabilities of the modular linking system. The end caps 25, 25' are rotatable by 360° around the central axis C. The balls 26, 26' are in principle freely rotatable in all directions, but when the rods 23, 23' are inserted in the balls 26, 26', are limited to move along the first opening 33, 33' of the end caps 25, 25', rotating up to an angle of approximately 90° with respect to the central axis C. Therefore the rods 23, 23' can be orientated substantially within a hemisphere. The angle can also be greater than 90°, depending on the design of the end cap 25, 25'. The angle can exceed 90° depending on the distance of the domed shape part of end cap 25, 25' and the beginning of the module body 20 or shell 21, 21'. For example when the end cap 25, 25' has a bulbous shape, the first opening 33, 33' can be much larger, allowing the angle to exceed 90°. When the rods 23, 23' are fixed in position and orientation, the module body 20 and the shell 21, 21' can nevertheless be rotated 360° around the central axis C to orientate the locking means 24, 24' at a convenient location and allow an easy access.

FIG. 4a is a sectional view of the inside of the linking module showing the (un-) locking mechanism of the module body, comprising wedges 29, 29' and discs 30, 30'. By screwing the locking means 24, 24', the wedges 29, 29' are either pushed away from the center and each other or pulled closer together. When pulled closer together, the wedges 29, 29' push the discs 30, 30' out, into the direction of the balls 26, 26', which in turn press the balls 26, 26' against the end caps 25, 25', respectively. The balls 26, 26' are split so they close in when getting compressed, reducing the size of the central hole 28, 28'. In this way a rod 23, 23' inserted into a center hole 28, 28' gets tightly clamped.

By fixing the shells 21, 21' around the module body 20, the end caps 25, 25' are fixed between the shells 21, 21' and the module body 20 by a hook-type connection, allowing a free rotation of the module body 20 and the end caps 25, 25' around the central axis C. This hook-type connection can be best seen in the detailed view of FIG. 4, where a hook connection portion 36 of the end cap 25, 25' and a corresponding hook receiving portion 35 of the shells 21, 21' form the hook-type connection between the hook connection portion 36 of the end cap 25, 25' and the corresponding hook receiving portion 35 of the shells 21, 21'. When the locking means 24, 24' is not tightened, the assembly of the end caps 25, 25', the shells 21, 21' and the module body 20 nevertheless cannot fall apart, since the end caps 25, 25' are held between the shells 21, 21' and the module body 20.

According to the detailed view of FIG. 4, the hook type connection between the hook connection portion 36 of the end cap 25, 25' and the hook receiving portion 35 of the shells 21, 21' is realized by a contact area 37, shown as being slightly rotated to an axis perpendicular to the central axis C, i.e. having an inclination angle $\alpha$ of around 5°. When applying a force on the end caps 25, 25' along the central axis C, for example by pushing the balls 26, 26' against the end caps 25, 25' via the discs 30, 30', the end caps 25, 25' transfer this force to the shells 21, 21' via the hook type connection. In order to increase the strength and durability of the connection between the hook connection portion 36 of the end cap 25, 25' and the hook receiving portion 35 of the shells 21, 21' the contact area 37 can be designed to be $0<\alpha\leq45°$. When applying a force on the end caps 25, 25' along the central axis C, the force will then be split into its vector components according to the inclination of the contact area 37, leading to a stronger and tightened connection between the shell 21, 21' and the end caps 25, 25' by pushing the end caps 25, 25' closer to the shell 21, 21'.

Figure 5:
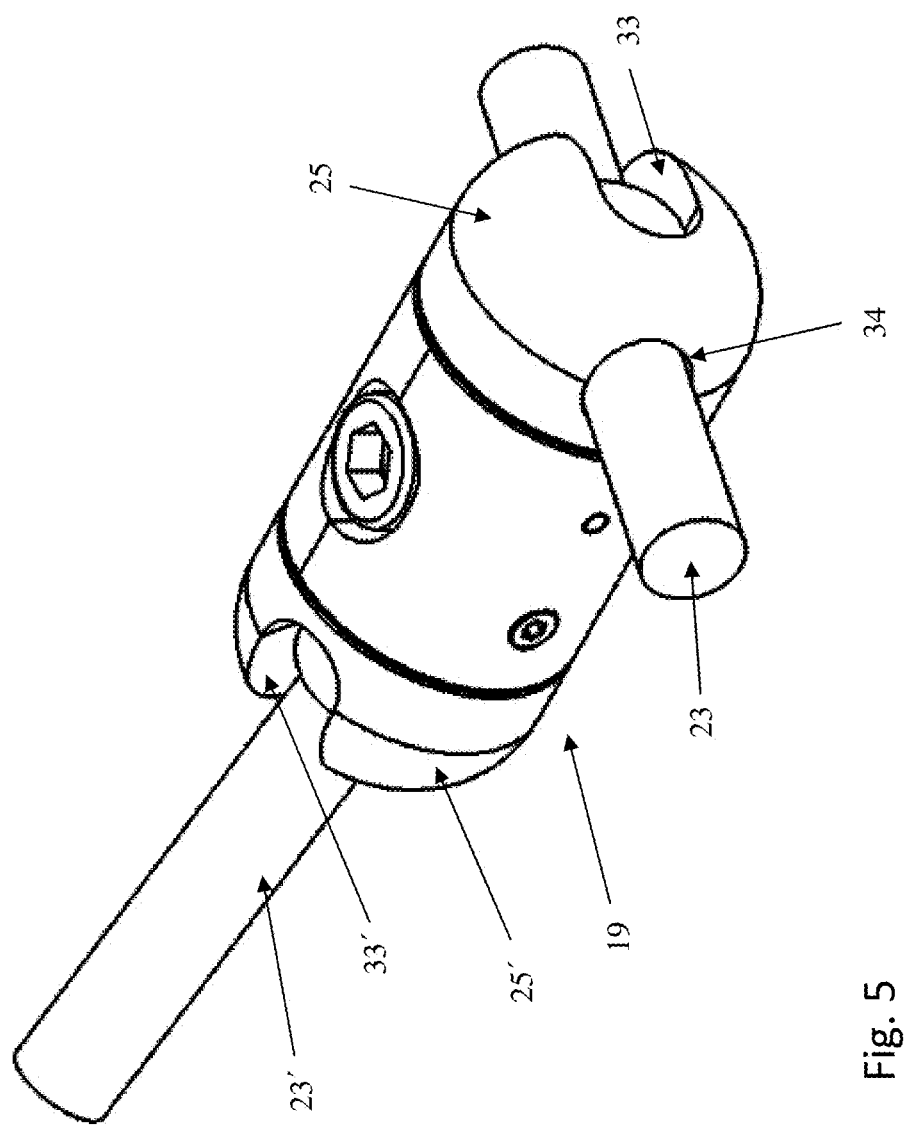
FIG. 5 is a perspective view of the modular linking system of FIGS. 2 to 4 in form of a T-connection.

FIG. 5 shows a second embodiment of a modular linking system of the present invention. The end caps 25, 25' have a second opening 34, 34' opposite a part of the first opening 33, 33', with the openings 33, 33'; 34, 34' allowing the rod 23, 23' to pass both openings 33, 33'; 34, 34' in order to provide a T-connection. The rods 23, 23' therefore necessarily slide through the complete balls 26, 26'

Figure 6:
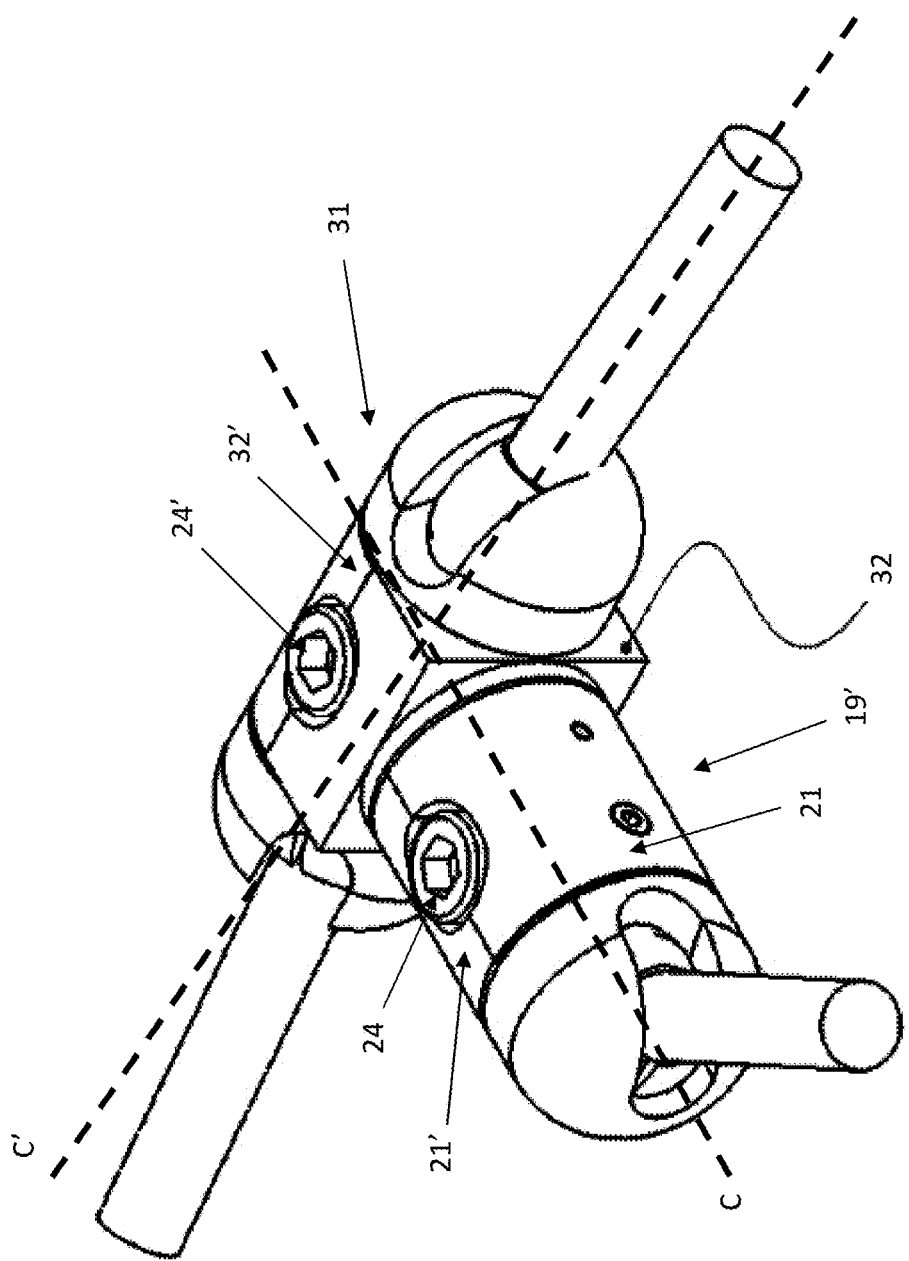
FIG. 6 is a perspective view of a modular linking system according to a second embodiment of the invention.

FIG. 6 shows a modular linking system according to a third embodiment of the present invention. At least one of the shells 21, 21' of one linking module 19 are replaced by star shells 32, 32', forming a star linking module 31. Star shells 32, 32' are adapted to also connect to at least one other linking module 19' in place of a ball joint and offer therefore an additional axis C', in particular an additional axis perpendicular to the center axis C. Every ball joint can be in principle replaced with a star module 31 to create additional axis. Star shells 32, 32' can also be adapted to have more than one connection to other linking modules.

The star shells 32, 32' are here shown to have a rectangular form. But of course the shape can be the same as the shells 21, 21' while having protrusions matching at least in part the hook-type connection between end cap 25, 25', shell 21, 21' and module body 20. This allows the linking module 19' to still rotate around the center axis C. Protrusions of a different form can also be provided around the circumference of star linking module 31 around the axis C', and together with a connection adapter to connect to linking module 19', allows the rotation of star linking module 31 around the axis C'

The links are here depicted as passive and massive rods 23, 23' of variable length. But it should be understood that they can also be realized in various shapes and forms, massive or hollow, with holes and pins, and of different sizes. Additionally they can comprise active functions, for example a joint, a hinge, a spring, a gooseneck, a thread, a ratchet and other suitable features. They can be formed out of and/or comprise a huge variety of materials, for example comprising different types of metal, plastic, glass, carbon, fiber glass, graphene, shape memory alloys, magnetic and nonmagnetic materials and so on.

The locking means 24, 24' is used for (un-)locking the links, switching between the locking state and at least one release state. In the embodiments presented here, a single screw is used to (un-) lock both sides of the linking module 19. However, a separate locking means 24, 24' for both sides can also be used to allow one side to stay fixed while the other side can be reconfigured. For (un-)locking, instead of the depicted screw, different locking means can also be used, operating the (un-)locking mechanism in a different way. For example employing a nut-type connection around the circumference of the linking module and adapting the (un-)locking mechanism allows an easy access and handling with a wrench. The mechanism can also be internally realized by using a ratcheting mechanism, improving and facilitating the handling even more.

End cap 25, 25' can also be configured to have further an individual locking mechanism for individually locking the orientation of the end cap to the shell 21, 21'; 32, 32' and/or the module body 20. This individual locking mechanism can be for example disposed on the outer surface of the end cap 25, 25' or integrated into the end cap 25, 25'. After positioning the rod 23, 23' and, when present, the locking means 24, 24', the additional locking mechanism can for example slide over the outer surface of the shells 21, 21'; 32, 32' to connect to a corresponding receiving portion. In this way the position of the rod 23, 23' can be additionally fixed, giving the connection a greater resistance against forces. Additionally it is also possible to design the individual locking mechanism to also compress the ball 26, 26' when locking the end cap 25, 25' to the shell 21, 21'; 32, 32'. The additional individual locking mechanism can also operate within the linking module, connecting the end cap 25, 25' to at least part of the module body 20.

Figure 7:
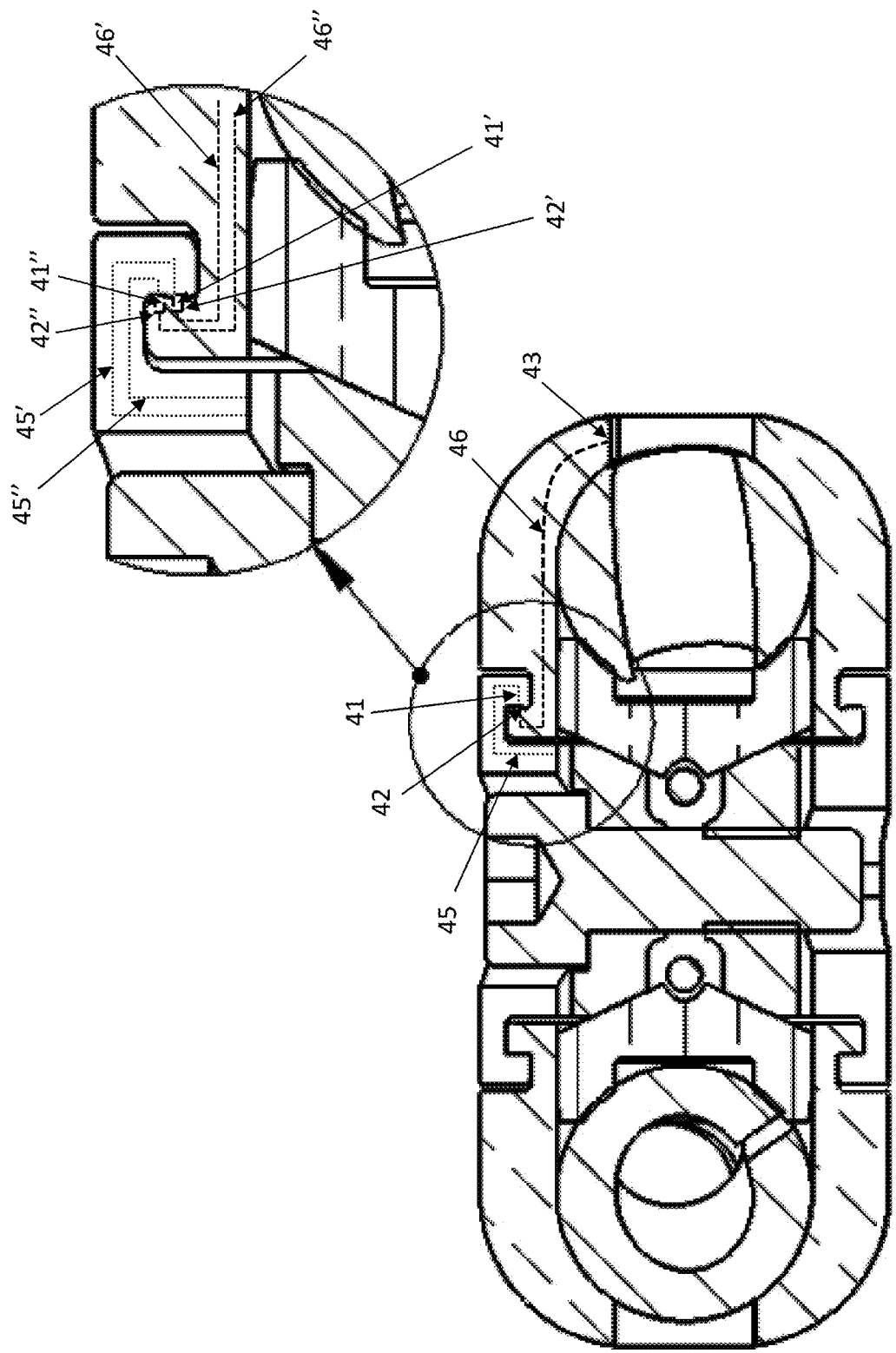
FIG. 7 is a sectional view of the linking module according to a third embodiment of the invention, together with an enlarged view of a part thereof.

One additional function which can be incorporated into the embodiments of the modular linking system of the invention is to provide an integrated electric distribution capability along the modular linking system, for distributing power and/or data. This reduces the number or the length of external wires or makes the usage of external wires obsolete. An example of such a configuration is shown in FIGS. 7 and 8. The linking module 19 is equipped with a inlet/outlet 40 for connecting plugs and the linking module 19 is also equipped with electronics (not shown here), especially control electronics in form of at least one electronic board. Conductors are provided to electrically connect the inlet/outlet 40 and/or the electronics to the shells 21, 21', 32, 32' (not shown). Furthermore, conductors 45, 45', 45" are incorporated into the shells 21, 21', 32, 32', which feature a shell connection portion 41 at least at parts of those areas, at which an end cap 25, 25' or a star module 31 can be attached. These shell connection portions 41 are for example present at the complete circumference of the shell 21, 21', 32, 32', but can also be restricted to special areas. The end caps 25, 25' have in turn corresponding receiving portions 42, also preferably at the complete circumference of the end caps 25. They also feature incorporated conductors 46, 46', 46" and a connection portion 43 for electrically connecting to the rods 23, 23'. Conductors (not shown), electrically isolated against the environment, are incorporated inside the rods 23, 23' for transferring power and/or data from one linking module 19 to at least one other linking module 19. Preferably at the end portions of the rods 23, 23', link receiving portion 44, 44', 44" are provided. These link receiving portions 44, 44', 44" electrically connect to the corresponding connection portions 43 of the end caps 25, 25'. In this way an electrical connection from one linking module 19 to at least another linking module 19 can be realized. By connecting multiple linking modules 19, a power network and/or a network for exchanging information is realized. By using the inlets/outlets 40, external equipment can be connected to the network, supplying and/or receiving power and/or information. Using adapters, equipment can also be directly electrically and/or physically connected to the receiving portions 44, 44', 44" of the rods 23, 23'.

In the detailed view of FIG. 8 two conductors 45, 45' incorporated in the shell 21, 21', 32, 32' and two corresponding conductors 46', 46" incorporated in the end caps 25, 25', connected via connection and receiving portions 41', 41" and 42', 42", respectively, are depicted exemplarily, the numbers may vary depending on the design. Also the function of receiving and connection portions can be reversed, depending on the design. The receiving portions, for example the receiving portions 42, 42', 42", are here in these figures shown as comprising the corresponding connection portions, i.e. 41, 41', 41". But it is also possible to have receiving and corresponding connection portions which are designed to meet and contact each other without one comprising the other. Alternatively or additionally, contactless power and data transmission techniques, such as induction coupling, magnetic resonance coupling, capacitive coupling, microwave power transmission techniques and/or laser power transmission techniques can be used to transfer power and/or data between one linking module 19, the rods 23, 23', another linking module 19 and/or external equipment.

As shown in FIG. 8, the electrical connection between the end cap 25, 25' and the rod 23, 23' can be realized via receiving portions 44, 44', 44", for example realized as grooves, in the rod 23, 23' and corresponding connection portions 43 in the end cap 25, 25'. This connection can be for example realized across the edge of the first opening 33, 33' of the end cap 25, 25'. The conductors are incorporated inside the rods 23, 23' and isolated from each other and from the material of the rod 23, 23'. Also shown in FIG. 8 is a plug inlet/outlet 40 for connecting external devices. Due to the advantageous properties of the present invention, not only the locking means but also the inlet/outlet 40 can be rotated 360° around the central axis C to orientate the inlet/outlet 40 at a convenient location and allow an easy access when rod 23, 23' is fixed.

The connection between the connection portions 41, 41', 41"; 43 and the corresponding receiving portions 42, 42', 42"; 44, 44', 44' can also be mechanically connected after positioning and fixing the rod 23, 23', for example via a switch, a slider or a button. The connections portions 41, 41', 41"; 43 can also be equipped with springs to allow for a good connection capability while maintaining flexibility. The connections portions 41, 41', 41"; 43 can take various forms and shapes, for example pins or bars, and can be also designed to prevent wrong connections, for example by having connection means and corresponding receiving means of different sizes and shapes for different conductors 45, 45', 45"; 46, 46', 46" and/or connection positions.

Alternatively the connection from the linking module 19 to the rods 23, 23' can also be done via the balls 26, 26'. Here the main difficulty is the changing orientation of the balls 26, 26' with respect to the module body 20 and/or the shell 21, 21'; 32, 32'. One possibility to solve this problem is outlined as follows: Multiple connection areas are distributed over the surface of the ball 26, 26' and the end cap 25, 25', the disc 30, 30' and/or other elements in contact with the ball 26, 26'. By orientating the ball 26, 26', different connection areas of the ball 26, 26' come into contact with different connection areas of the surrounding elements. The electronics can be adapted to change the signal configuration depending on the orientation of the ball 26, 26' and/or rod 23. By reconfiguring the electrical signal paths, the electric distribution is independent of the ball orientation.

Depending on the number of conductors provided, different systems or protocols can be realized. For example a USB system, a Firewire system, a PowerLan system, a HomePlug system, a LAN system, a power system or combinations thereof can be realized via the links of the modular linking system.

For sealing the elongated opening and other connection and receiving portions against environmental influences, flexible sealing means, for example rubber lips, can be employed.

The features disclosed in this specification, the claims and the figures maybe important for the claimed invention, taken separately or in any combination, for the respective different embodiments.

The principle and mode of operation of this invention have been explained and illustrated in its preferred embodiment. However, it must be understood that this invention may be practiced otherwise than as specifically explained and illustrated without departing from its spirit or scope.

What is claimed is:

1. A modular linking system with at least one linking module and at least one link to be connected therewith, the linking module comprising
    a module body;
    a locking means; and
    at least one ball joint with a ball, the ball having a slit and a central opening in form of a through hole along a center line, the at least one link configured to be at least partly inserted into the central opening, and the locking means being adapted to releasably lock the orientation and position of each link inserted into the central opening defining a locking state and at least one release state;
    wherein at least two shells, which are adapted to be attached to the module body, and the at least one ball joint comprises an end cap, which has a first elongated opening and is rotatably held between the module body and shells, with the ball being rotatably arranged between the module body and the end cap and the ball at least partly being housed within the end cap.

2. The modular linking system of claim 1, wherein the end cap has a bulbous shape, and/or the end cap is adapted to be arranged at least next to the module body, and/or the end cap is adapted to encompass at least part of the module body.

3. The modular linking system of claim 1, wherein the first elongated opening of the end cap is adapted to allow a rotation of the link locked within the ball in a range from 0° to about 150°, relative to the central axis of the linking module, and/or the end cap comprises a second opening aligned to the first elongated opening to allow the link to pass both openings in order to provide a T-connection.

4. The modular linking system of claim 1, wherein the at least one end cap is provided with at least one first connection portion, and the shells are provided with at least one second or third connecting portion suited to engage the at least one first connection portion to form a hook-type connection, with the connection being adapted to rotatably hold the at least one end cap between the module body and shells and/or extending substantially around the complete circumference of the at least one end cap and/or the shells.

5. The modular linking system of claim 4, wherein the at least one first connection portion of the at least one end cap and the at least one second or third connecting portion of the shells have an inclination angle with respect to an axis perpendicular to the central axis, with $0°<\alpha\leq 45°$, preferably $\alpha=5°$.

6. The modular linking system of claim 1, wherein the module body comprises at least one wedge and/or at least one disc cooperating with the locking means for locking the link within the central opening by at least partly closing the slit.

7. The modular linking system of claim 6, wherein the at least one wedge has a rotationally symmetric shape substantially in form of a cone, and/or the at least one wedge is provided with an threaded opening, and/or the at least one wedge is moved in a first direction, substantially perpendicular to the central axis of the linking module and/or towards the central axis, in the locking state, and is moved in a second direction, opposite of the first direction, in the at least one release state.

8. The modular linking system of claim 6, wherein the at least one disc has a rotationally symmetric shape, and/or the at least one disc is provided with a depression complementary to the shape of the ball to engage the same, and/or the at least one disc is moved in a third direction, substantially parallel to the central axis of the linking module in the locking state, and is moved in a fourth direction, opposite of the third direction, in the at least one release state.

9. The modular linking system of claim 1, wherein the shells house at least part of the module body, and/or the shells are secured to the module body via at least one bolt, and/or the shells are connected with each other via a bayonet connection.

10. The modular linking system of claim 1, wherein the locking means comprises a screw, and/or the locking means comprises a nut disposed around the circumference of the module body, and/or the locking means comprises a ratchet mechanism.

11. The modular linking system of claim 1, wherein the modular linking system comprises at least two ball joints, such that where of two ball joints are provided, the two ball joints are arranged at opposite sides of the module body, or where three ball joints are provided, each one is arranged at an end of a T form.

12. The modular linking system of claim 6, wherein two wedges cooperate with two discs in one linking module.

13. The modular linking system of claim 1, wherein the modular linking system comprises at least two linking modules being adapted to be connected to each other, with two connected linking modules carrying three ball joints, and/or two connected linking modules having different structures, and/or a first linking module having a substantially cylindrical form with two ends, and/or at least one second linking module being attachable to one of the two ends of a first linking module.

14. The modular linking system according to claim 13, wherein at least one of the shells of a second linking module comprises a third connection portion adapted to engage the second connection portion of at least one other shell of a first linking module), with the connection between the shells being of a hook-type or bayonet-type, and/or the second linking module being held between the module body and shells of the first linking module, and/or at least part of the first linking module being adapted to be rotated around its central axis and at least part of the second linking module being adapted to be rotated around its central axis.

15. The modular linking system of claim 14, wherein one of the shells of the second linking module comprises at least two corresponding third connection portion adapted to form a connection with the second connection portions of the shells of the first linking module, and/or at least two of the shells of the second linking module comprise each at least one third connection portion adapted to form a connection with second connection portions of shells of at least two first linking modules.

16. The modular linking system of claim 14, wherein the modular linking system comprises an adapter element adapted to connect at least two linking modules, in particular to connect at least one first linking module with at least one second linking module.

17. The modular linking system of claim 1, comprising a plurality of linking modules wherein each linking module together with at least one link connected thereto, is adapted to provide an integrated power and/or data distribution network, where at least one of the plurality of linking modules comprises an inlet/outlet for connecting external devices to the integrated power and/or data distribution network.

18. The modular linking system of claim 1, wherein the locking means is adapted to individually lock the orientation and position of each inserted link, defining an individual locking state and at least one individual release state per link, and/or each end cap comprises an additional locking means for locking the orientation thereof relative to the shell and/or the module body, the additional locking means is also adapted to at least partly close the slit of the ball arranged therein and/or to engage the link.

19. A wheelchair kit comprising a modular linking system with at least one linking module and at least one link to be connected therewith, the linking module comprising a module body;
   a locking means; and
   at least one ball joint with a ball, the ball having a slit and a central opening in form of a through hole along a center line, the at least one link configured to be at least partly inserted into the central opening, and the locking means being adapted to releasably lock the orientation and position of each link inserted into the central opening defining a locking state and at least one release state;
   wherein at least two shells, which are adapted to be attached to the module body, and the at least one ball joint comprises an end cap, which has a first elongated opening and is rotatably held between the module body and shells, with the ball being rotatably arranged between the module body and the end cap and the ball at least partly being housed within the end cap.

20. The wheelchair kit of claim 19, wherein at least one first linking module body, at least one second linking module and at least three, rod shaped, links.

21. A wheelchair comprising at least one modular linking system with at least one linking module and at least one link to be connected therewith, the linking module comprising a module body;
   a locking means; and
   at least one ball joint with a ball, the ball having a slit and a central opening in form of a through hole along a center line, the at least one link configured to be at least partly inserted into the central opening, and the locking means being adapted to releasably lock the orientation and position of each link inserted into the central opening defining a locking state and at least one release state;
   wherein at least two shells, which are adapted to be attached to the module body, and the at least one ball joint comprises an end cap, which has a first elongated opening and is rotatably held between the module body and shells, with the ball being rotatably arranged between the module body and the end cap and the ball at least partly being housed within the end cap.

* * * * *